United States Patent
Shimirak et al.

(12) 
(10) Patent No.: US 6,616,460 B1
(45) Date of Patent: Sep. 9, 2003

(54) TELECOMMUNICATIONS CONNECTOR

(75) Inventors: Gerald-Leu Shimirak, Holly Springs, NC (US); Andrew Philip Bennett, London (GB); Richard Escane, Petts Wood (GB); Derec Ian Sheals, Dartford (GB); Henry John Sinigiani, San Matco, CA (US)

(73) Assignee: Channell Limited, Kent (GB)

( * ) Notice: Subject to any disclaimer, the term of this patent is extended or adjusted under 35 U.S.C. 154(b) by 0 days.

(21) Appl. No.: 09/672,670

(22) Filed: Sep. 28, 2000

(51) Int. Cl.[7] .............................................. H01R 29/00
(52) U.S. Cl. ...................................................... 439/49
(58) Field of Search ........................... 439/49, 52, 709, 439/922; 379/438, 413.04, 412; 361/119

(56) References Cited

U.S. PATENT DOCUMENTS

| | | | | |
|---|---|---|---|---|
| 3,842,212 A | * | 10/1974 | Miller | 379/84 |
| 4,122,313 A | * | 10/1978 | De Luca | 379/327 |
| 4,175,811 A | * | 11/1979 | Coldren et al. | 439/507 |
| 4,846,735 A | * | 7/1989 | Teichler et al. | 439/709 |
| 4,913,663 A | * | 4/1990 | Siemon et al. | 439/509 |
| 5,802,170 A | | 9/1998 | Smith et al. | 379/412 |
| 5,910,877 A | * | 6/1999 | Paske et al. | 361/119 |
| 6,065,975 A | * | 5/2000 | Daoud | 439/49 |
| 6,196,862 B1 | * | 3/2001 | Dooley | 439/412 |
| 6,222,717 B1 | * | 4/2001 | Waas et al. | 361/119 |

FOREIGN PATENT DOCUMENTS

| | | |
|---|---|---|
| FR | 2524723 A | 10/1983 |
| GB | 2201846 A | 9/1988 |

* cited by examiner

Primary Examiner—Lynn Feild
Assistant Examiner—Thanh-Tam Le (57) ABSTRACT

A telecommunication connector for a distribution point comprises a base part and a detachable configuration module, the configuration module being able to take a plurality of dispositions with respect to the base part, the base part having connection means to (i) a telecommunications cable from an exchange, (ii) a cable to a further distribution point, and (iii) a cable to a consumer, wherein the configuration module causes electrical connection from the exchange to the further distribution point in a first disposition but not in a second disposition. This permits the installer who is connecting a new consumer to disconnect the unnecessary part of the wire forming the relevant pair when activating the service whilst leaving intact the investment in the network. The configuration module can also contain protective devices for the line, such as three or five pin protection, over current devices and over voltage devices, or other active electronic elements. It is further preferred that in the first orientation, the configuration module causes electrical connection between the exchange and consumer to be broken.

9 Claims, 10 Drawing Sheets

TELECOMMUNICATIONS CONNECTOR

TECHNICAL FIELD OF THE INVENTION

The present invention relates to an electrical connector for use in telecommunications.

BACKGROUND ART

Telecommunications utilities provide a network of cables through which the calls they handle can be routed. These cables can be of optical fibre or conductive copper, but the end of the network close to the subscriber is usually copper. As the network is usually of necessity laid prior to application for service by subscribers, it is necessary to provide a flexible network which can be reconfigured as required by the pattern of subscribers, and to allow for disconnection, reconnection, and connection of new subscribers.

Accordingly, the usual practice of a utility when laying a new local network is to install a multi-pair cable, such as a 400 pair cable, from the exchange past a number of distribution points. Each individual pair is accessible at several distribution points, so the resulting network is highly flexible. This practice is acceptable for voice telephony and low speed data use.

A distribution point is typically housed in a cabinet at the roadside, although other arrangements are used, and contains an array of connectors at which wire pairs leading to the consumer premises can be attached to form a spur. Each spur is tapped into a pair of the cable, enabling service to be provided. If that service is discontinued, the relevant spur is removed and the connector becomes available for use in providing service to another consumer.

However, when a connection is made at a distribution point other than the last, the additional cable between the chosen distribution point and the last acts as a further spur of cable off the electrical path between the exchange and the subscriber. In high speed data uses such as ISDN and DSL/ADSL, this further spur is one of the factors placing an upper limit on the available speed. It is therefore necessary on occasions to "clean the copper", ie locate the spurs of unused copper and cut them off. This is a lengthy process, estimated at costing $800 per pair, and also reduces the flexibility of the network to meet future demand. If the service to that subscriber is discontinued then that pair can only be reused if another consumer adjacent the same distribution point happens to request service. Even then, it is unlikely that sufficiently accurate records could be kept to enable that pair to be re-used.

SUMMARY OF THE INVENTION

The present invention therefore provides a telecommunications connector for a distribution point comprising a base part and a detachable configuration module, the configuration module being able to take a plurality of dispositions with respect to the base part, the base part having connection means to (i) a telecommunications cable from an exchange, (ii) a cable to a further distribution point, and (iii) a cable to a consumer, wherein the configuration module causes electrical connection from the exchange to the further distribution point in a first disposition but not in a second disposition.

This permits the installer who is connecting a new consumer to disconnect the unnecessary part of the wire forming the relevant pair when activating the service. If service should be discontinued, the pair can be reconstructed. This leaves intact the investment in the network. Such an operation can also be carried out by an installer without assistance from the specialist cable engineer required for cleaning the copper. By integrating the reconfiguration into the connector unit a reliable and reusable network is achieved which can be manipulated by non-specialist staff.

The configuration module can also contain protective devices for the line, such as three or five pin protection, over current devices and over voltage devices, or other active electronic elements such as (but not limited to) line termination devices, remote identification devices, and so on.

It is further preferred that in the first orientation, the configuration module causes electrical connection between the exchange and consumer to be broken. Thus, the exchange is always connected to either a consumer or a further distribution point (except at the last), but potentially never both.

A removable configuration module can thus be provided with seven electrical connections, being two each for the pairs leading to the exchange, further distribution point and consumer, together with an earth. Thus, in another aspect the present invention also relates to a seven pin protector module for a telecommunications line. However, designs with less than 7 pins or more than seven pins are possible. Accordingly, the present invention also relates to a five pin protector module for a telecommunications line which is adapted to seat in a seven pin socket of a base unit. However, designs with less than 7 pins or more than 7 pins in the base unit are again possible.

BRIEF DESCRIPTION OF THE DRAWINGS

Embodiments of the present invention will now be described with reference to and/or as illustrated in the accompanying figures, in which.

DETAILED DESCRIPTION OF THE EMBODIMENTS

Figure 1:
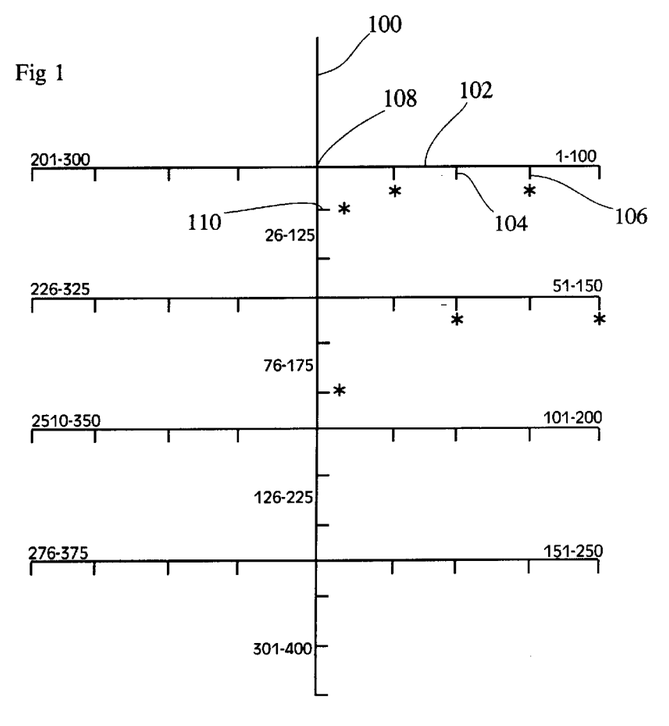
FIG. 1 is a schematic illustration of a local telephone network.

Referring to FIG. 1, a typical local network includes a 400-pair cable 100 which enters the area to be served and splits into branch cables such as 102 which contain a lesser number of pairs. Each branch cable is connected to a number of distribution points such as those at 104 and 106. The cable branches repeatedly at branch points such as 108 so as to serve a large number of such distribution points. An individual pair, such as (for example) pair number 81 of the 400 may itself branch at a number of such branching points 108 and be made available at a number of distribution points on that branch and on other branches. FIG. 1 shows the pair numbers which (in this example) are made available on each branch or segment of the line. The distribution points at which pair no. 81 is available are indicated with a *. It will be seen that this pair is available at six distribution points and branches twice along its length.

This branching does not present a problem in voice telephony and low rate data use. The demands placed on the electrical properties of the pair are sufficiently light to cope with such branching. However, high speed data use such as ISDN and DSL/ADSL demand a better response and the signal echo generated by branches such as are shown in FIG. 1 produces an unacceptable impairment of the electrical properties. Therefore, assuming that the subscriber was connected to the network via pair 81 at distribution point 106 it will be necessary to locate distribution point 110 where pair 81 is also available, identify the appropriate wire pair and cut it. There will be a short branch between branching point 108 and distribution point 110, but this is not so long to detrimentally affect the electrical properties of the pair. However, this process is lengthy and expensive since specialist cable connection staff must be called upon, and involves a permanent degradation of the network capabilities.

Figure 2:
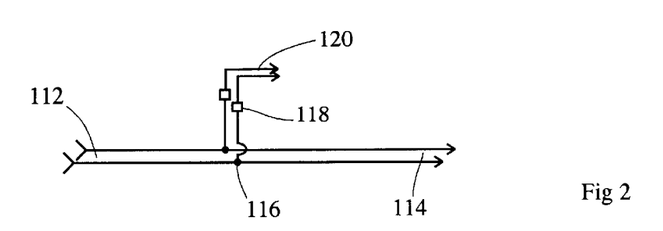
FIG. 2 is a schematic illustration of the electrical structure at a distribution point according to the prior art.

FIG. 2 shows the typical electrical structure at a distribution point. A wire pair 112 enters the distribution point and continues on through and out as 114. Electrical connections 116 are made with each wire of the pair and brought to a connector 118 which is usually of the insulation displacement type (IDC). At the IDC connector 118, a pair 120 is connected and leads away from the distribution point to the subscriber.

Where no subscriber is connected at that distribution point, the pair therefore continues undisturbed. Where a subscriber is connected, this is essentially by way of a tap on to the existing wire pair.

Figure 3:
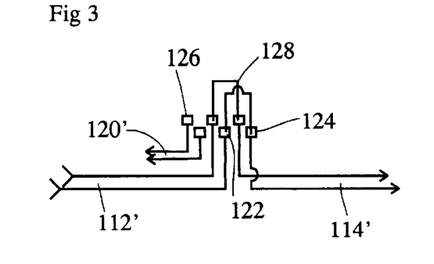
FIG. 3 is a schematic illustration of the electrical structure at a distribution point according to the present invention, in a first orientation.
Figure 4:
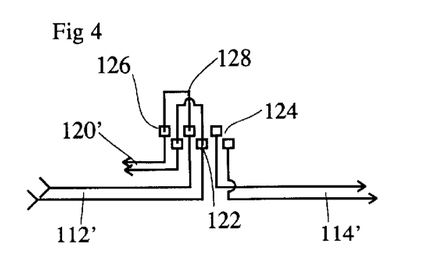
FIG. 4 is a schematic illustration of the electrical structure at a distribution point according to the present invention, in a second orientation.

FIGS. 3 and 4 illustrate the principle behind the present invention. A wire pair 112' enters the distribution point and departs as wire pair 114'. However, the two wire pairs are not connected together directly but instead each end at connectors 122, 124 respectively. A consumer pair 120' also leaves the distribution point for the subscriber's premises but is connected to a third connector 126. A configuration module is connectable to any or all of the three connectors 122, 124, 126 and contains a pair of bridging links which are able to bridge appropriate pairs. In this position illustrated at FIG. 3, the bridging links 128 bridge connections 122 and 124 and therefore link the incoming wire pair 122' with the outgoing wire pair 114'. The subscriber pair 120' is left unconnected.

In the second disposition shown in FIG. 4, the conductors 128 of the configuration unit bridge connectors 122 and 126 thereby connecting the subscriber pair 120' to the incoming wire pair 112'. It is to be assumed that the incoming wire pair 112' is from the exchange and the outgoing wire pair 114' is to a further distribution point. Thus, in this disposition, the subscriber is connected to the exchange but the "tail" of unused wire pair is left isolated, not forming part of the circuit to the subscriber.

In the configuration shown in FIG. 1, it would then be a simple matter to visit distribution point 110 and change the disposition of the configuration unit in a like fashion. This could be done by unskilled staff since it does not require interference with the cabling network. Equally, the process is easily reversible should service need to be ceased to that subscriber, allowing the wire pair to be redeployed for a different subscriber at a different distribution point. This would completely clean the copper in a simple and reversible fashion.

FIGS. 5 to 9 show a first working example of how this might be put in practice. The embodiment consists of two main parts, a base unit 200 shown in FIG. 5 and a configuration unit 202 showing in FIGS. 6 and 9. The base unit 200 contains seven conductors 204 which are accessible on the underside of the base unit 200 via IDC connectors. These are presented within a recess 206 on the upper surface of the base unit 200 as upstanding metal blades such as 208. Of the seven blades, six are parallel and arranged in pairs, one pair at one end of the recess 206, one pair at the opposite end of the recess 206 and the third pair at the centre of the recess. The seventh blade 210 is presented at right angles at the centre of the recess 206 between a pair.

Figure 5:
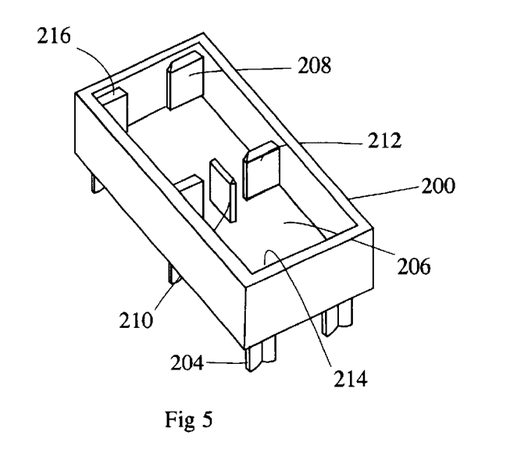
FIG. 5 is a perspective view from above of a base unit according to a first embodiment of the present invention.

In use, the central pair 212 is connected to the wire pair 112' from the exchange. The pair of connectors 214 at one end of the recess are connected to the ongoing pair 114' leaving two further distribution points. The pair of blades 216 at the other end of the recess 206 are connected to the subscriber pair 120'.

Figure 6:
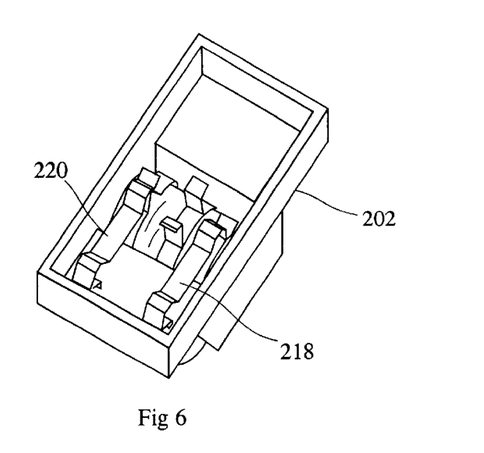
FIG. 6 is a perspective view from below of a configuration module according to the first embodiment.
Figure 9:
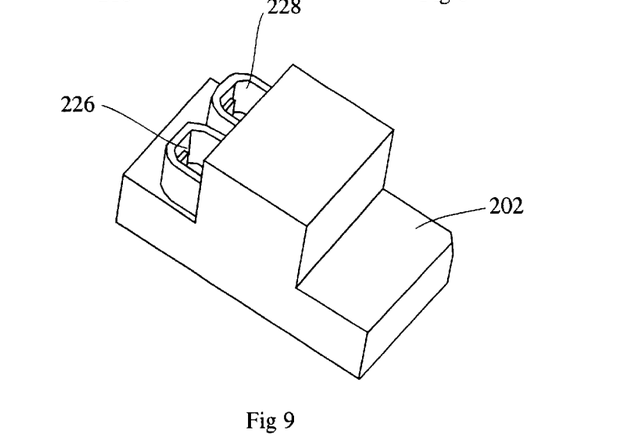
FIG. 9 is a perspective view from above of the configuration unit of the first embodiment.

The configuration unit 202 contains two conductors 218, 220. These are spaced and arranged so that they will bridge the gap between either blades 212 and 214 or blades 212 and 216. The mating surfaces between the base unit 200 and the configuration unit 202 are made symmetric under a rotation of 180° and therefore the configuration unit 202 can be placed in any one of two dispositions so as to effect connection between the appropriate set of blade pairs.

Thus, when placed in the first orientation the configuration unit causes the incoming wire pair or 112' from the exchange to be connected to the outgoing wire pair 114' to further distribution points. When inserted in a rotated disposition, the configuration unit 202 causes the incoming wire pair 112' to be connected to the subscriber 120 and disconnected from the outgoing wire pair 114'. Thus, the principle illustrated in FIGS. 3 and 4 is effected.

Figure 8:
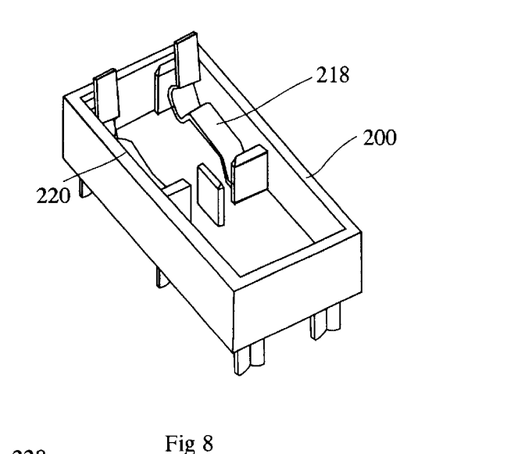
FIG. 8 is a perspective view from above of the base unit of the first embodiment showing the electrical conductors of the configuration module in place.

FIG. 8 shows the base unit 200 with the conductors 218, 220 of the configuration unit 202 in place and the remainder of the configuration unit 202 cut away. It will be seen that the conductors make electrical contact on one side of the blades 208.

Figure 7:
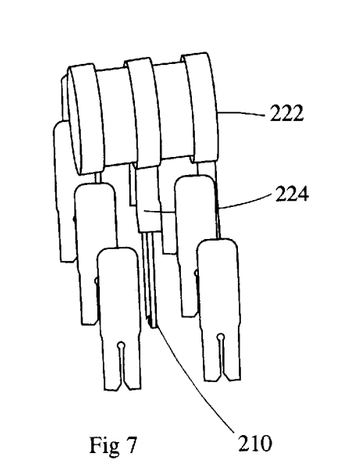
FIG. 7 is a cut away view showing the electrical contacts and surge arrestor only of the base unit and the configuration module of FIGS. 5 and 6.

FIG. 7 shows the two units connected but with all non-conducting parts removed. It can be seen that a three pole protection module 222 such as a gas discharge tube is connected at either end to the conductors 218, 220 and at its centre to a further conductor 224 which grips the sides of the earth contact 210. Thus, the configuration unit 202 is also able to offer protection to the line if desired. It will be seen that if protection is undesired for a particular line, the protection unit 222 can simply be omitted.

FIG. 9 shows the configuration unit 202 from above. A pair of recesses 226, 228 are formed into which extend the ends of the conductors 218, 220. The recesses 226, 228 would normally be filled with a gel, grease, or other conformable material to allow environmental protection. Nevertheless, such material can be penetrated by crocodile clips or test leads of various types thereby allowing test access to the port. Thus, for maintenance purposes an engineer will be able to make temporary contact to the line to ascertain whether or not a call is in progress. If not, he can remove the configuration unit 202 and gain access to the three wire pairs therewithin. If testing of a central pair 212 reveals no connection to the exchange, the engineer can ascertain whether the pair has been disconnected at a distribution points closer to the exchange. The engineer can also test the quality of the line from blade 216 to the subscriber, thereby achieving "look both ways testing".

Figure 10:
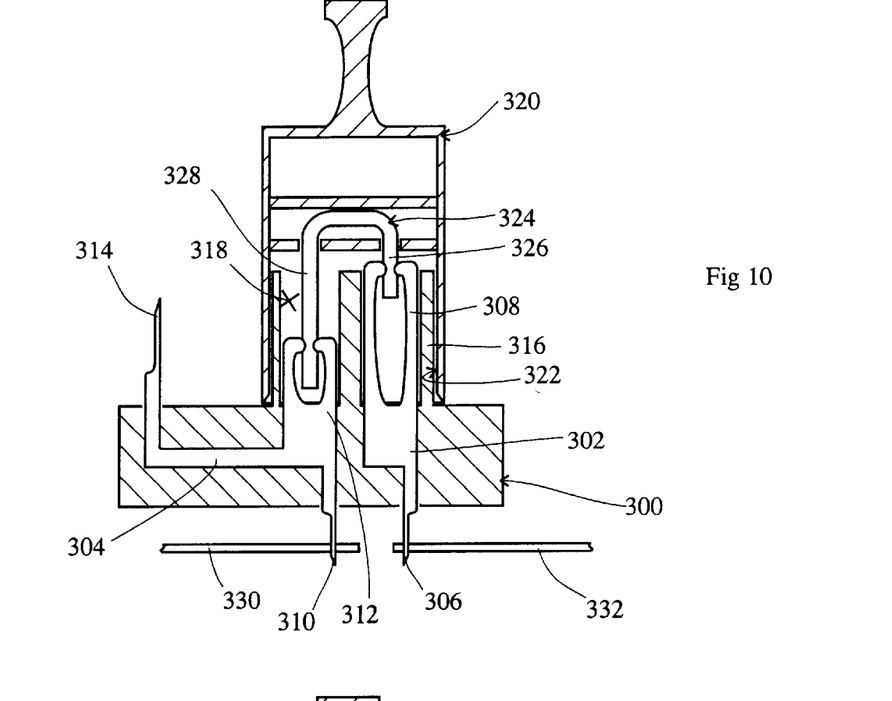
FIG. 10 is a sectional view of a second embodiment of the present invention, in a first disposition.
Figure 11:
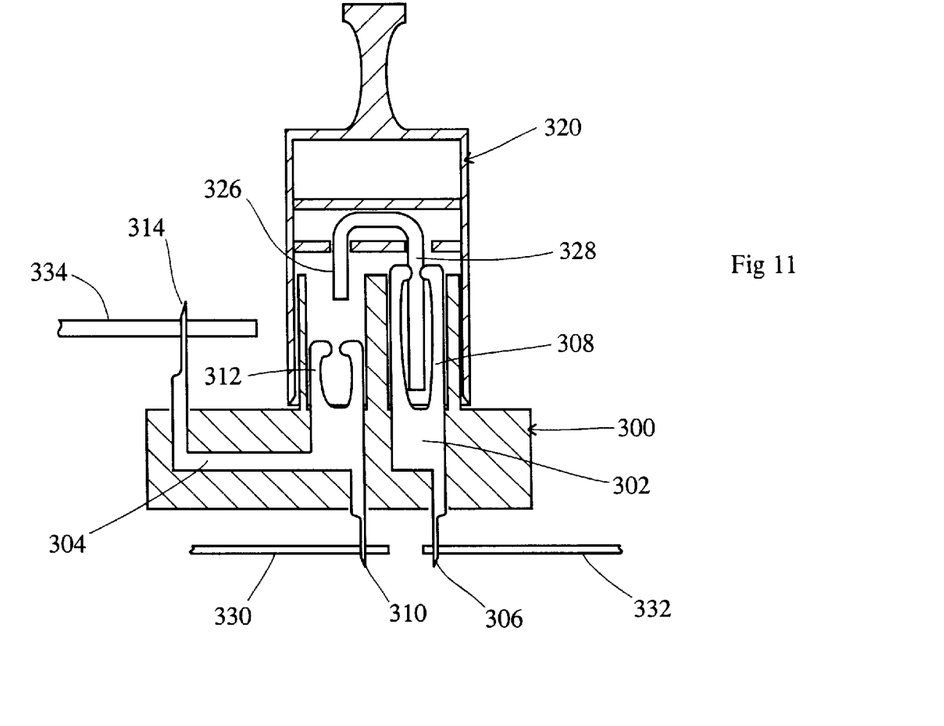
FIG. 11 is a sectional view according to FIG. 10 but showing a second disposition.

A further embodiment of the invention will now be described with reference to FIGS. 10 and 11. A base unit 300 contains a pair of conductors 302, 304. The first conductor 302 consists of a first lower IDC contact 306 which projects from the lower face of the base unit 300 and a first upper split beam contact 308 which projects upwardly of the base unit 300. The second conductor 304 consists of a second lower IDC contact 310 which also projects from the lower face of the base unit 300, a second upper split beam contact 312 which also projects upwardly of the base unit 300 adjacent to the first upper split beam contact, and a subscriber IDC contact 314 which projects upwardly of the base unit 300 at a location displaced from the second upper IDC contact 312. The first and second upper split beam contacts 308,312 project upwardly of the base unit 300 by different lengths, the second (312) being shorter.

A mating face 316 is formed on the upper surface of the base unit 300 around the first and second upper split beam contacts, enclosing them within a recess 318 so as to permit environmental protection by way of gel, grease or the like, and also supporting them so as to prevent unintended deformation during use. A configuration module 320 is formed with a complementary mating face 322 to allow it to be joined to the base unit 300. The mating faces 316, 322 are symmetrical under a 180° rotation and therefore the configuration unit can be attached in at least two dispositions.

The configuration module 320 contains a conductor 324 which has two legs 326, 328 extending towards the space enclosed by the mating face 322 of the configuration module 320. The leg 328 is longer than the leg 326 by a length corresponding to the difference in length of the first and second upper split beam contacts 308, 312.

The subscriber IDC contact 314 may be supported appropriately in a suitable structure and provided with wire carrying structures to permit a wire to be inserted and removed as necessary. The precise structure of this is not germane to the present invention and will not be described in detail. Suitable structures are illustrated and described in our earlier patent publications GB 2129630 and EP0683925.

This arrangement is duplicated alongside the above-described arrangement so as to allow for wire pairs to be connected. For ease of explanation, the connection of one wire of the pair will be described. The other wire of the pair connects in like fashion to the duplicate.

In use, the base unit 300 is installed at a distribution point and a wire pair 330 from an exchange is attached to the second lower IDC contacts 310. A wire pair 332 leading to a further distribution point is attached to the first lower IDC contacts 306. The configuration unit 320 is attached via the mutual mating faces in a first disposition such that the longer leg 328 mates with the (shorter) second upper split beam contact 312 and the shorter leg 326 mates with the (longer) first upper split beam contact 308. Thus, the wire pair 330 is connected to the wire pair 332 and the pair is in effect allowed to continue through the distribution point to a more distant distribution point.

When a subscriber is to be connected, a test probe can be attached to the subscriber IDC contact to ensure that a call is not then in progress. Assuming not, the configuration module is then removed, breaking the pair at that distribution point. A wire pair 334 leading to the subscriber's premises is then attached to the subscriber IDC contacts 314 and the configuration unit 320 replaced in a disposition which differs by a 180° rotation.

In this rotated disposition, the longer leg 328 is above the first upper spilt beam contact 308 and makes contact therewith. The first upper split beam contact 308 is designed so as to be able to accept the length of the leg 328. However, the shorter leg is insufficiently long to meet the second upper split beam contact 312 and accordingly there is no electrical continuity between the conductors 302, 304. The pair therefore remains broken at this distribution point, but in a reversible fashion since connection can be remade by replacing the configuration unit 320 in its original disposition. The subscriber is nevertheless connected to the exchange since the second lower IDC contacts 310 and the subscriber IDC contacts 314 are parts of the same electrical conductors 304.

Figure 19:
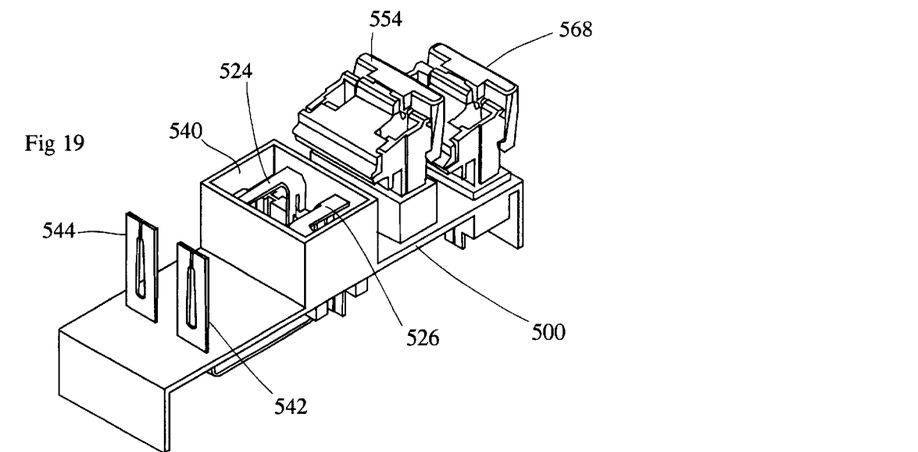
FIG. 19 is a perspective view of the third embodiment, showing the base unit and the conductors only of the configuration unit.
Figure 20:
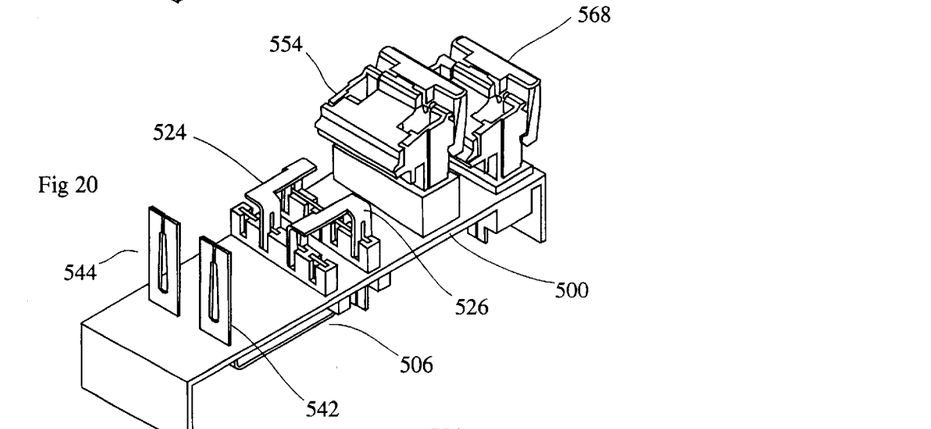
FIG. 20 is a perspective view of the third embodiment, showing the base unit partially cut away and the conductors only of the configuration unit.
Figure 21:
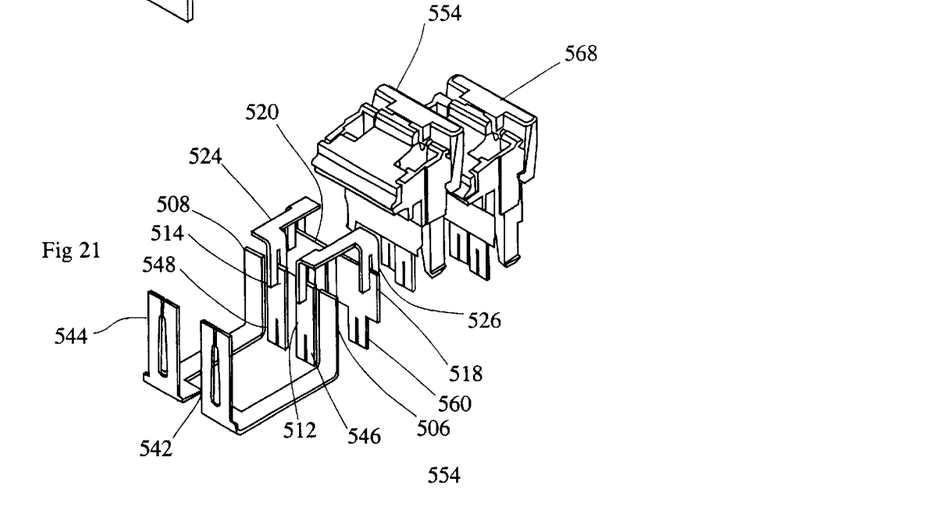
FIG. 21 is a perspective view of the third embodiment, cut away to show the conductors only of the base and configuration unit together with the connection means.

A yet further embodiment of the present invention will be described with reference to FIGS. 12 to 23. FIGS. 12 to 18 show the contacts and conductors only for clarity, FIGS. 19 to 21 show a physical arrangement corresponding to FIGS. 12 to 18, and FIGS. 22 and 23 show the necessary connections on the rear face of the arrangement shown in FIGS. 19 to 21.

Figure 12:
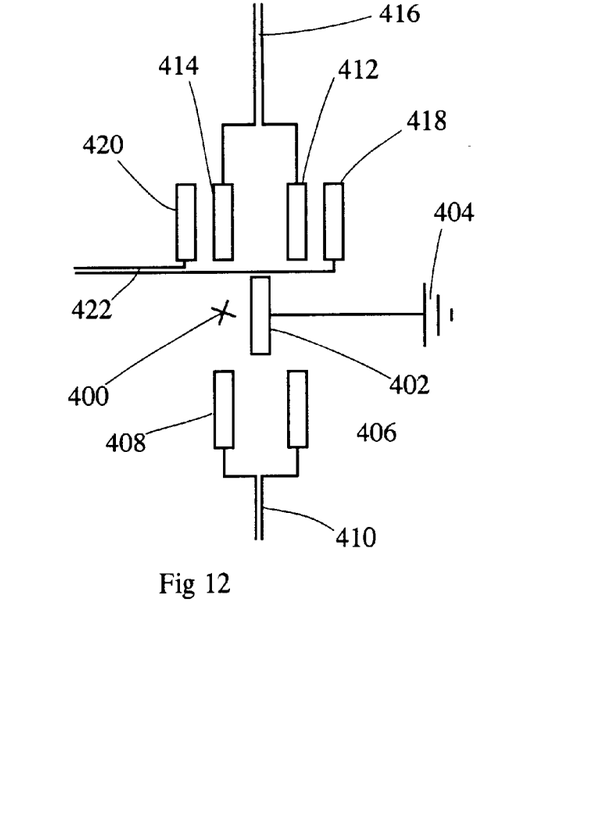
FIG. 12 is a schematic view of the electrical connections to the base unit according to a third embodiment.

Thus, in FIG. 12 there is shown a plan view of a 7-pin connection point 400. A central pin 402 is connected to earth 404. A subscriber pair of connectors 406, 408 located to one side of the central earth connector 402 are connected to a wire pair 410 leading to a subscriber's premises. On the other side of the earth connector 402 are two pairs of connectors, a first pair 412, 414 which are connected to a wire pair 416 leading to a subsequent distribution point and a second pair 418, 420 arranged either side of the first pair 412, 414 and which are connected to a wire pair 422 leading to the exchange.

Figure 13:
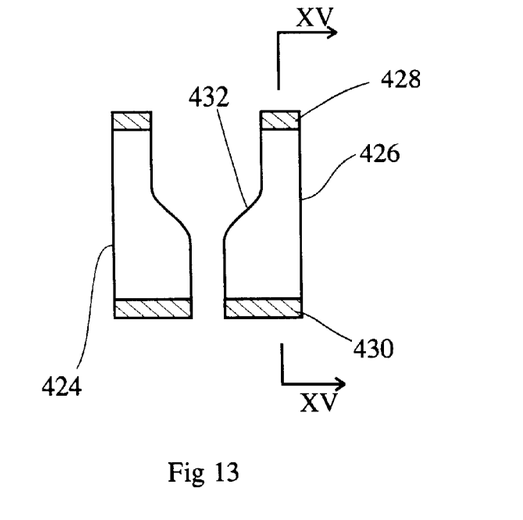
FIGS. 13 and 14 are top and sectional views of the electrical conductors of an unprotected configuration unit according to the third embodiment, respectively, FIG. 14 being a section on XV of FIG. 13.
Figure 14:
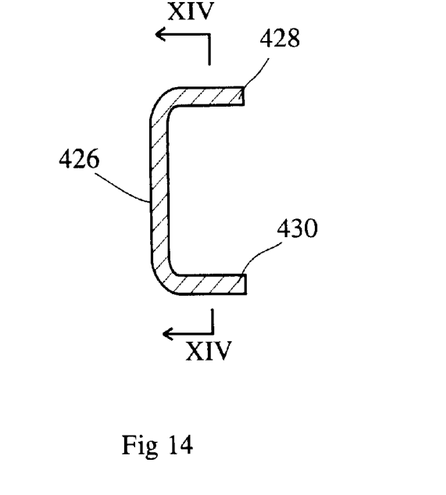

A configuration module contains a pair of conductors 424, 426 arranged and formed as shown in FIGS. 13 and 14. Each is generally U-shaped with a connection point at either free end 428, 430 of the U. One free end 428 is half the width of the other 430, achieved by a step 432 along the U-profile, on one side. The other conductor 424 has a like step in a mirror image configuration. The free ends of the conductors 424, 426 are able to mate with the connectors 406, 408, 412, 414, 418 and 420 by suitable IDC formations on the latter (not shown).

Figure 15:
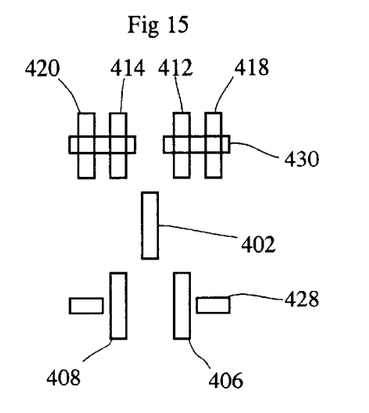
FIGS. 15 and 16 are top views of the mating parts only of the electrical conductors of both the base and configuration units of the third embodiment, when connected in a first and second disposition respectively.
Figure 16:
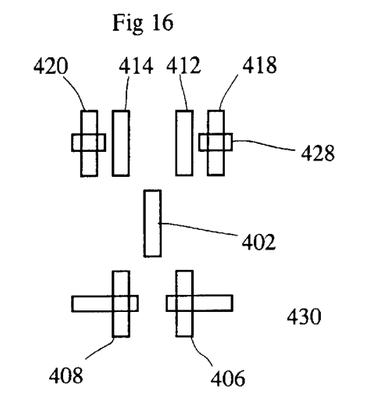

FIGS. 15 and 16 show how these conductive elements can be connected. FIG. 15 shows a first disposition. The conductors 424, 426 of the configuration unit engage with those connectors of the base unit 400 which are in an appropriate location to meet. Thus, the wider free ends 430 bridge the first and second pairs of connectors 412, 418 and 414, 420 respectively whilst the narrower free ends 428 miss the subscriber pair 406, 408 since the asymmetric step 432 results in the narrower free end 428 being offset.

In the second disposition shown in FIG. 16, the configuration module is rotated through 180°. This places the narrower free ends 428 in the vicinity of the first and second pairs of connectors 412, 418 and 414, 420 and the wider free ends 430 in the vicinity of the subscriber pair of connectors 406, 408. Thus, connection is made with the subscriber pair, but the narrower free end 428 only makes connection with the second pair 418, 420 leading to the exchange. Thus, the subscriber is connected to the exchange but the spare tail of wire pair leading to the further distribution point is disconnected giving a clean copper connection to the exchange.

Figure 17:
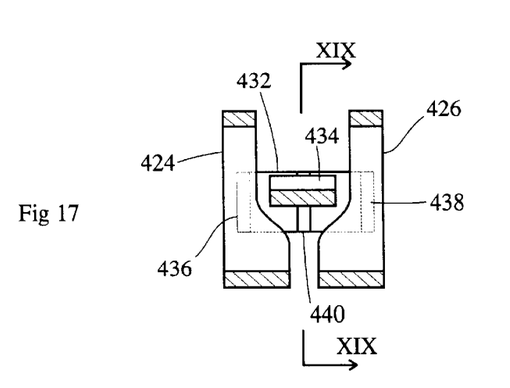
FIGS. 17 and 18 are top and side views of the electrical conductors of an protected configuration unit according to the third embodiment, respectively, FIG. 18 being a section on XIX—XIX of FIG. 17.
Figure 18:
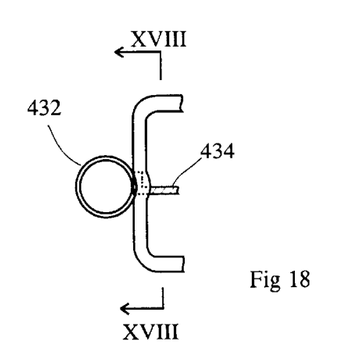

FIGS. 17 and 18 show the arrangement of conductors in a protected configuration module. A three pole protector 432 is located above the U-conductors 424, 426 such that its end caps 434, 436 contact the conductors. A further conductor 438 is arranged beneath the protector 432 in contact with its central earth contact 440, and descends downwardly to make contact with the earth connector 402 of the base unit 400, when in place.

FIGS. 19 to 22 show an example using the conductor arrangement principle shown in FIGS. 12 to 18. To demonstrate alternative ways of employing this principle, a physically different layout is illustrated in which the principle and mode of operation is however identical. To aid understanding, like reference numerals but incremented by 100 are employed to denote corresponding parts. Thus, FIGS. 19 to 21 show the base unit 500 including a recess 540 in which are located the subscriber pair 506, 508, first pair 512, 514 and second pair 518, 520 of contacts . The configuration module (not shown) is able to fit into the recess and contains the U-conductors 524, 526 (shown).

The subscriber pair of contacts 506, 508 lead to a pair of IDC contacts 542, 544 to which a wire pair leading to the subscriber's premises may be attached. The IDC contacts 542, 544 may be supported appropriately in a suitable structure and provided with wire carrying structures to permit a wire to be inserted and removed as necessary. The precise structure of this is not germane to the present invention and will not be described in detail. Suitable structures are illustrated and described in our earlier patent publications GB 2129630 and EP0683925.

Figure 23:
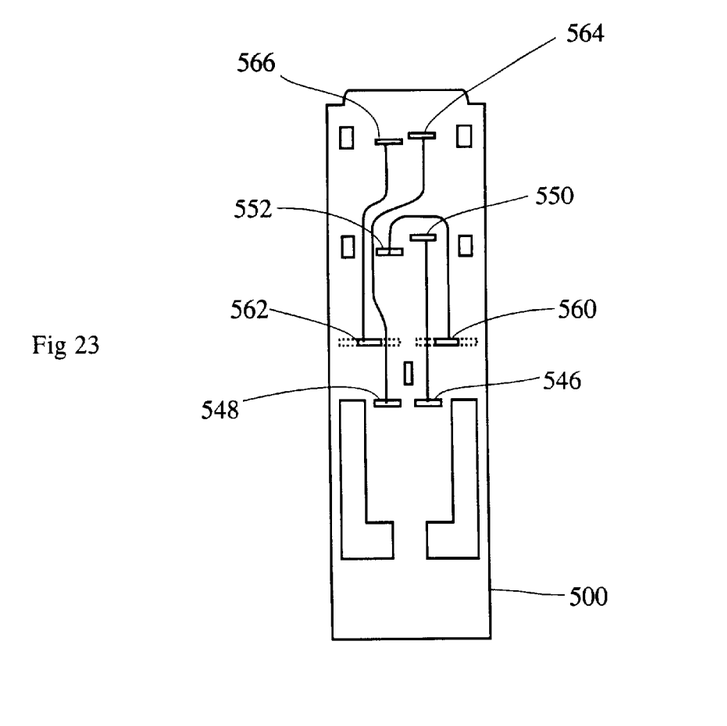

The first pair of IDC contacts 512, 514 lead to IDC contacts 546, 548 which project from beneath the base unit 500. As shown in FIG. 23 they are connected to the IDC blades 550, 552 of a first MINI ROCKER™ connector 554 via wires 556, 558, for receiving the wire pair leading to the further distribution point. MINI ROCKER™ connectors are single pair push-fit connectors for making connection to wire pairs as required. They are also shown, in a different context, in our earlier application published as GB 2293699.

Figure 22:
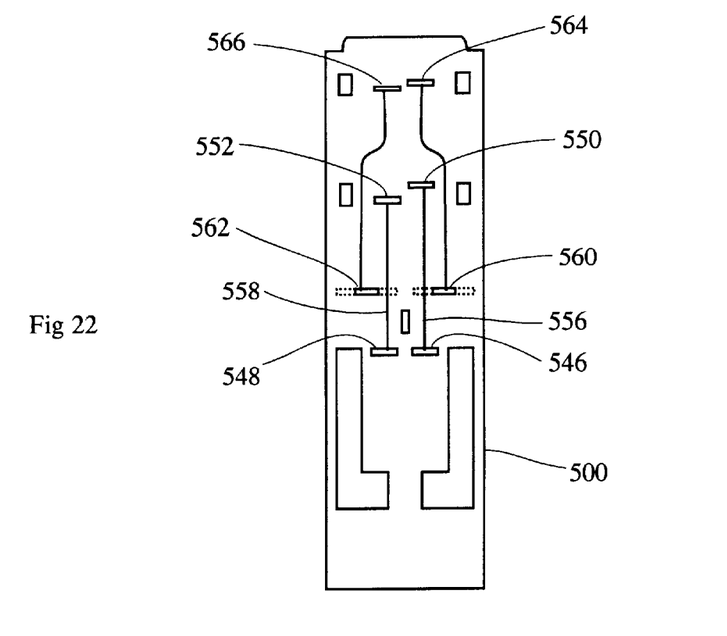
FIGS. 22 and 23 are views of the third embodiment from beneath, showing alternative connection routes.

The second pair of IDC contacts 518, 520 also lead to IDC contacts 560, 562 which project from beneath the base unit 500. As shown in FIG. 22 these are connected to the IDC blades 564, 566 of a second MINI ROCKER™ connector 568 for receiving the wire pair from the exchange.

Thus, the base unit 500 is fitted in a distribution point and wire pairs to the exchange and a further distribution point fitted to the MINI ROCKER™ connectors. The configuration unit is then inserted in a first disposition, connecting the first and second IDC connectors 512, 514 and 518,520, and linking the exchange pair to the further distribution point pair.

As and when a subscriber is to be connected, the configuration unit is removed and a subscriber pair connected to the blades 542, 544. The configuration unit is then replaced in a reversed disposition, thereby connecting the second IDC connectors 518, 520 to the subscriber IDC connectors 506, 508, linking the subscriber pair to the exchange pair and disconnecting the further distribution point pair.

If the subscriber needs to be disconnected, the configuration unit is removed, the subscriber pair removed, and the configuration unit replaced in its original orientation. The original network architecture is then restored with no loss of flexibility.

FIG. 23 shows an alternative wiring for the base unit 500. Instead of connecting the first IDC contacts 560, 562 to the first MINI ROCKER™ and the second IDC contacts 546, 548 to the second MINI ROCKER™, the A legs 546, 560 of the first and second IDC contacts are connected to the first MINI ROCKER™ and the B legs 548, 562 of the first and second IDC contacts are connected to the second MINI ROCKER™. Thus, to install the device the engineer fits the two A legs from the exchange and further distribution point pairs to the first MINI ROCKER™ and the B legs to the second MINI ROCKER™. In some circumstances that may be more convenient. The subsequent operation of the device is identical.

Finally, the fourth embodiment will be described with reference to FIGS. 24 to 27. This comprises a 5-pair base unit 600 which is modular in form allowing one or more further 5-pair base units 602 etc to be attached at an end, thereby forming a 10,15, 20 etc pair module as desired. An end cap 604 is provided to close the attachment points at the end of the base unit 600. A lid 605 is provided to seal the base unit against the environment when it has been installed. A base with a different number of pairs could alternatively be provided, but five is a convenient number.

Figure 24:
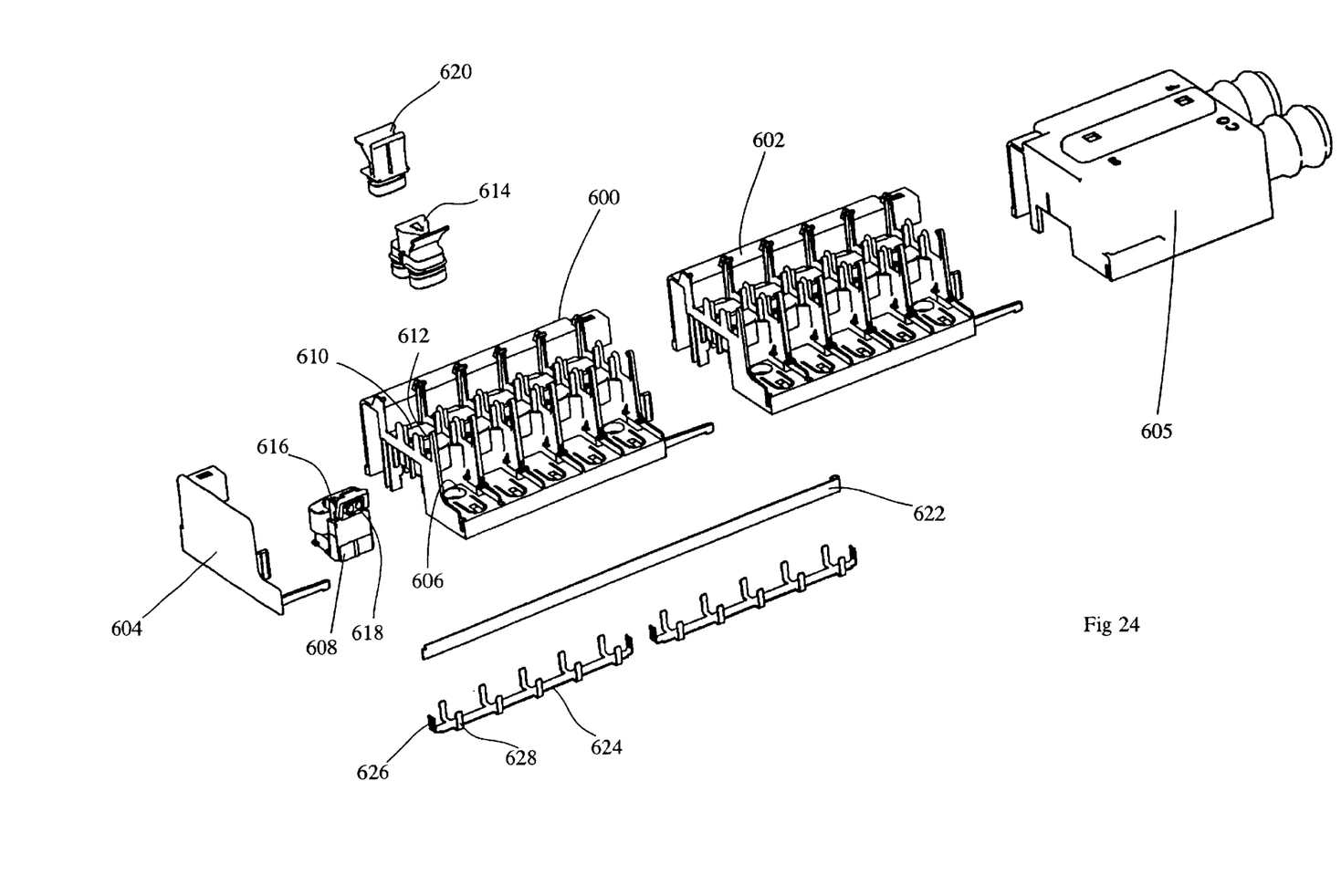
FIG. 24 is a perspective exploded view of a fourth embodiment.

Within each base unit 600, five substantially identical points are provided. Each point includes a formation 606 for receiving a consumer plug 608, adjacent a pair of sockets 610, 612 for the link pair and the exchange pair respectively. The sockets 610, 612 each contain a pair of connectors which are terminated via IDC blades at the rear on assembly or during installation with separate wire pairs. The pair to the exchange socket 612 leads back to the central exchange, possibly via other distribution points, and the pair to the link socket 610 leads onward to a further distribution point. If the unit 600 is installed at the last distribution point then the link socket 610 can be left unconnected.

A bridging link 614 fits into the sockets 610, 612 at the initial installation. This contains a pair of conductors which make contact with conductors in the link and exchange sockets via IDC connectors and thereby connect the exchange wire pair to the link wire pair as per FIG. 3.

When a consumer is to be supplied with service, the consumer plug 608 is inserted. It is held in place by retention formations (not shown in FIG. 24). Until now the relevant formation 606 for accepting this has been left empty, allowing the service provider to minimize investment in the plant. The consumer plug 608 comprises a consumer socket 616 akin to the link and exchange sockets 610, 612 and a MINIROCKER™ type connector 618 as described above. Conductors within the consumer plug 608 make the necessary links between conductors in the consumer socket and 616 and the MINIROCKER™. A wire pair leading to the consumer premises is then connected to the MINIROCKER™. Finally, the bridging link 614 is removed from the link and exchange sockets 610, 612 and re-inserted in a 180° rotated orientation into the exchange socket 612 and the newly provided consumer socket 616. Connection is therefore broken with subsequent distribution points and made with the consumer, as per FIG. 4. To close the link socket 610 and seal it against the environment, a cap 620 is provided.

Earth connections within the base unit 600 are provided by an earth bar 622 which runs the length of the combined units 600, 602 etc. Within each 5-pair unit 600, an earth strip 624 is provided which connects to the earth bar via an IDC connect 626 and provides the necessary earth conductors 628 appropriately positioned for access in the link and exchange sockets 610, 612. This permits protection to be integrated into the bridging link 614 if desired. Also, other active devices could be incorporated into the bridging link 614 as envisaged in our earlier publication EP 0683925. Such active devices include line termination devices, remote identification devices, subscriber management devices, or any desired device.

Figure 25:
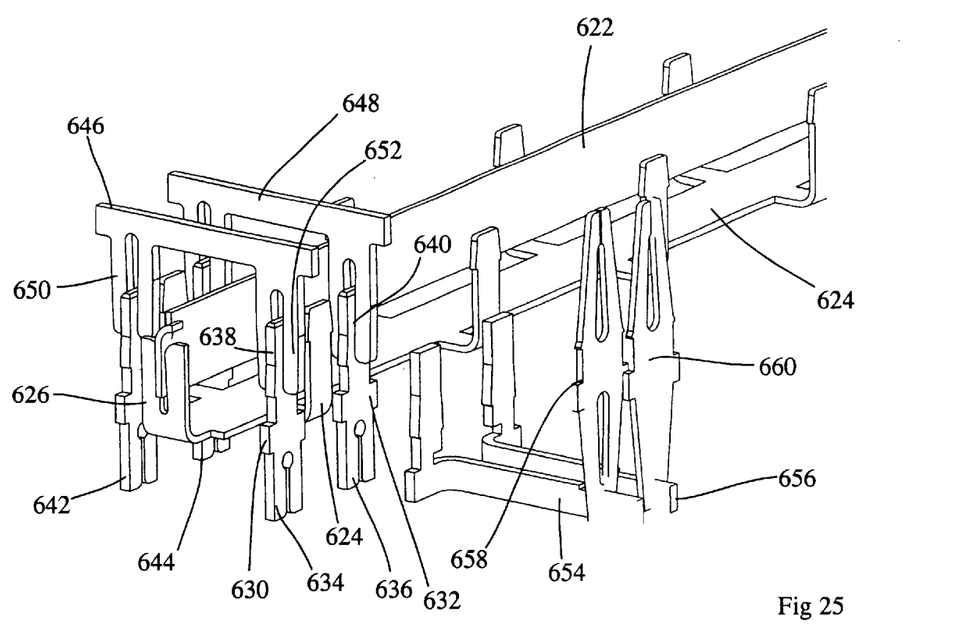
FIG. 25 is a perspective view of the conductive components of FIG. 24.

FIG. 25 shows the electrical conductors within the unit. As shown, the consumer plug 608 is present and the bridging link 614 is seated in the link and exchange sockets 610, 612. Either side of the earth bar 622 and earth strip 624 are two adjacent conductors 630, 632 for the exchange pair which have IDC blades 634, 636 at their lower extremities for connection to the wire pair and flat blades 638, 640 at their upper extremities for connection with the bridging link 614. A similar pair of conductors 642, 644 are provided for the link socket 610 for connection with a wire pair leading to any further distribution point.

Within the bridging link 614 are a pair of conductors 646, 648. Each extends from over the link socket 610 to over the exchange socket 612 and includes a pair of downwardly extending IDC blades 650, 652 projecting into the respective sockets and contacting with the conductors therein. Thus, with the bridging link in this position contact is made with between the exchange and link pairs.

Within the consumer plug 608, a pair of contacts 654, 656 extend from the consumer socket 616 to a point beneath the MINIROCKER™. A pair of double-ended IDC blades 658, 660 lie within the MINIROCKER™ and connect at their lower end with the contacts 654, 656. Their upper IDC contact is then available for connection to a wire pair leading to a consumer.

When the bridging link 614 is moved to the exchange socket 612 and the consumer socket 616, the contacts 656, 648 therein will instead connect the exchange contacts 634, 636 and the consumer contacts 654, 656.

Figure 26:
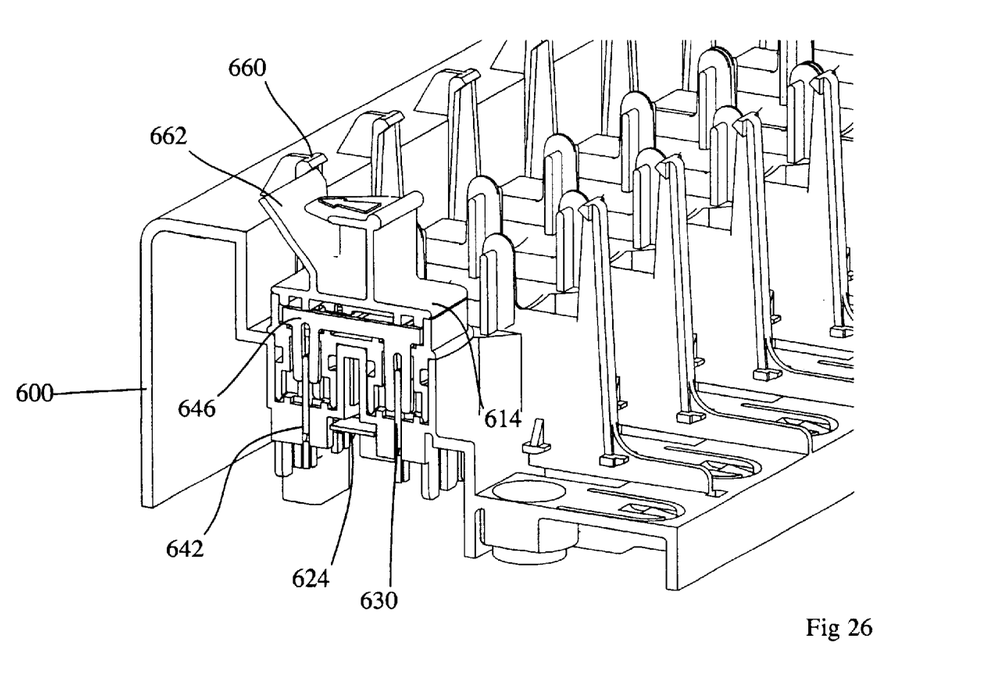
FIG. 26 is a perspective view of the operative parts of FIG. 24, in a first state.

FIG. 26 shows the unit with the bridging link 614 in the link and exchange sockets 610, 612, partially cut away. This will therefore correspond to FIG. 3, the system as originally installed. The consumer plug 608 has not yet been fitted. A latch 660 on the base unit 600 engages with a tang 662 on the bridging link 614 to retain it in place.

Figure 27:
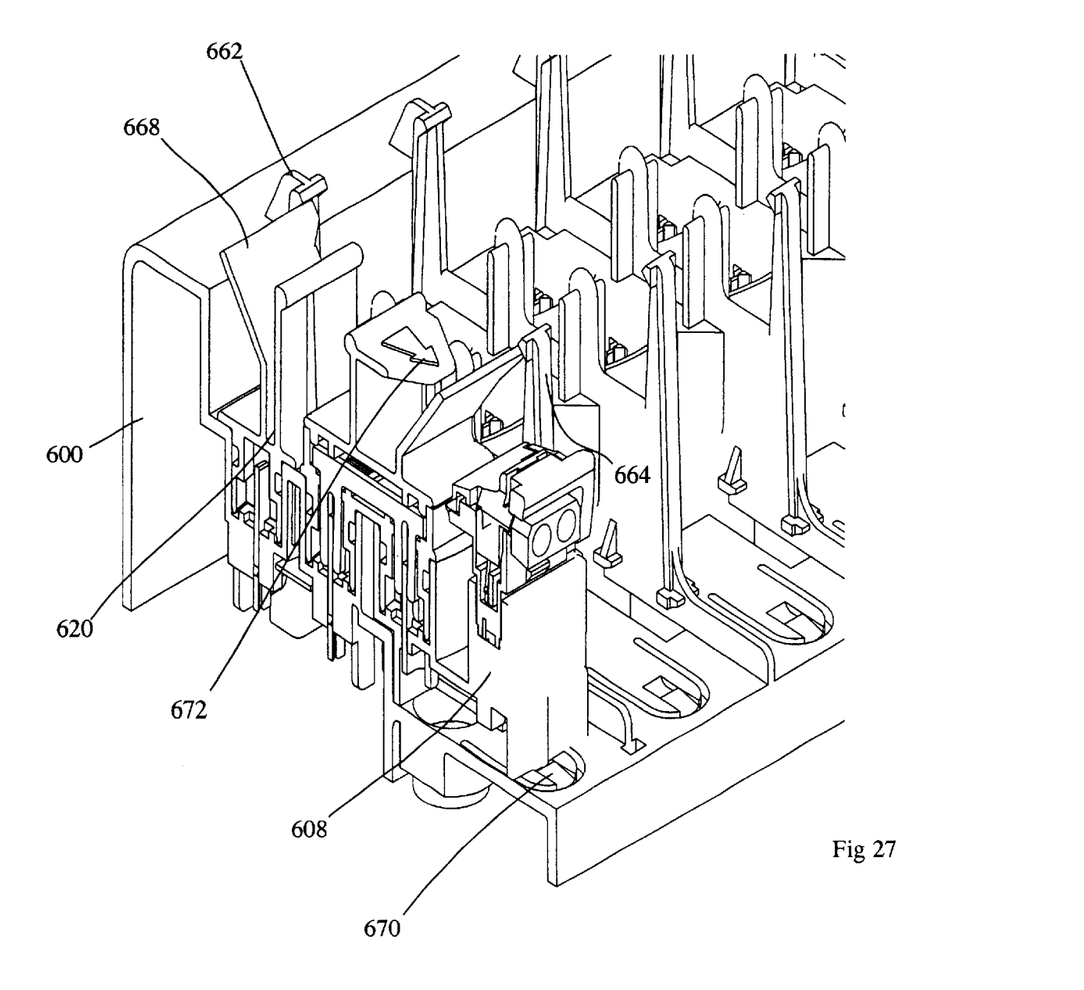
FIG. 27 is a perspective view of the operative parts of FIG. 24, in a second state.

FIG. 27 shows the unit with the consumer plug 608 present and the bridging link 614 in the exchange and consumer sockets 612, 616. It is retained by a further latch 664 which engages with the tang 662. The cap 620 is fitted in the link socket 610 and is retained by its own tang 668 which engages with the first latch 662. The retention formations 670 for retaining the consumer plug 608 are visible.

The multiple IDC blades of the bridging link 614 could be made multiple-use, ie able to withstand repeated insertions. Alternatively, the bridging link could be an inexpensive disposable item intended to be replaced at each reconfiguration of the line. The part will also be lightweight, enabling engineers to carry a stock of such items to replace each time one has to be removed.

In all embodiments, it would be convenient to mark the visible surface of the configuration unit with a suitable indicia such as an arrow, to indicate to an engineer the configuration of the device. Surrounding parts can then be marked with appropriate indicia such as "SUBSCRIBER" so that an arrow pointing at SUBSCRIBER indicates that the device is disposed so as to break the wire pair and connect to a subscriber pair connected to that distribution point or elsewhere (as in point 110 of FIG. 1). In the fourth embodiment, the bridging link 614 includes an arrow device 672 (FIG. 27) which denotes the appropriate link. An asymmetric keying arrangement prevents the bridging link 614 from being inserted into the link socket 610 or the consumer socket 616 if it is incorrectly aligned.

It will be appreciated that many variations can be made to the above-described embodiments without departing from the scope of the present invention.

What is claimed is:

1. A telecommunications connector for a distribution point, comprising a base part and a detachable configuration module, the configuration module being adapted to take one of a plurality of dispositions with respect to the base part, the base part having connection means to (i) a telecommunications cable from an exchange, (ii) a cable to a further distribution point, and (iii) a cable to a consumer, wherein the configuration module causes electrical connection from the exchange to the further distribution point in a first disposition but not in a second disposition.

2. A telecommunications connector according to claim 1 in which the configuration module contains a protective device for the line.

3. A telecommunications connector according to claim 2 in which the protective device is one of a three pin protection device, five pin protection device, an over current device and an over voltage device.

4. A telecommunications connector according to claim 1 in which the configuration module contains an active electronic element.

5. A telecommunications connector according to claim 4 in which the active electronic element is one of a line termination device and remote identification device.

6. A telecommunications connector according to claim 1 in which, in the first disposition, the configuration module causes electrical connection between the exchange and consumer to be broken.

7. A telecommunications connector according to claim 1 in which the telecommunications cable from the exchange comprises a cable having one or more branches that extend from the cable at one or more branch points for coupling the consumer to said exchange.

8. A telecommunications connector according to claim 7 in which the cable includes one or more distribution points along said cable to provide a location for coupling the consumer to said exchange.

9. A telecommunications connector according to claim 1 in which the cable to the further distribution point comprises a portion of the telecommunications cable from the exchange.

* * * * *